Sept. 9, 1969   E. D. GEORGE   3,465,933
PICK BREAKING APPARATUS
Filed Dec. 10, 1965   4 Sheets-Sheet 1
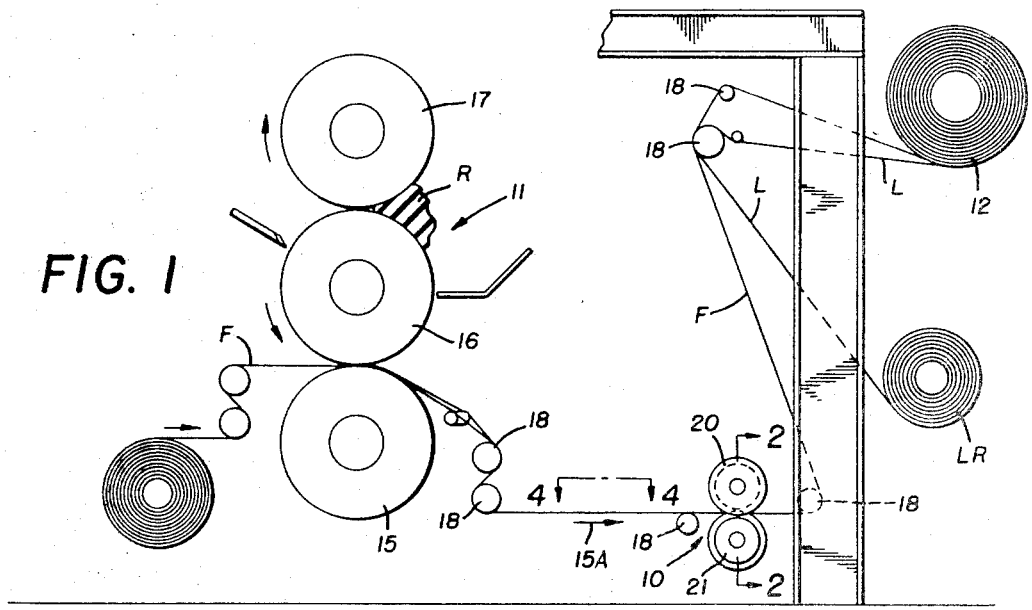
FIG. 1
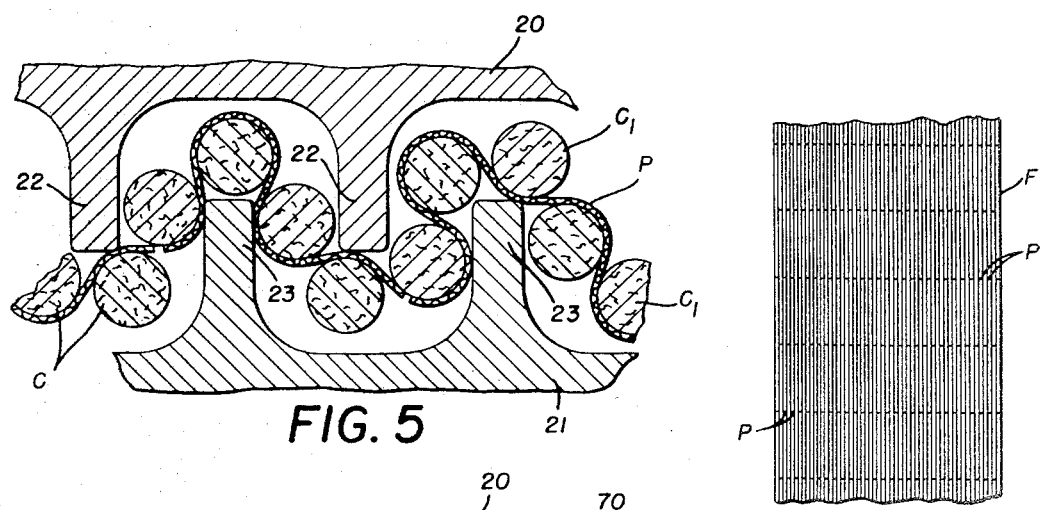
FIG. 5
FIG. 4
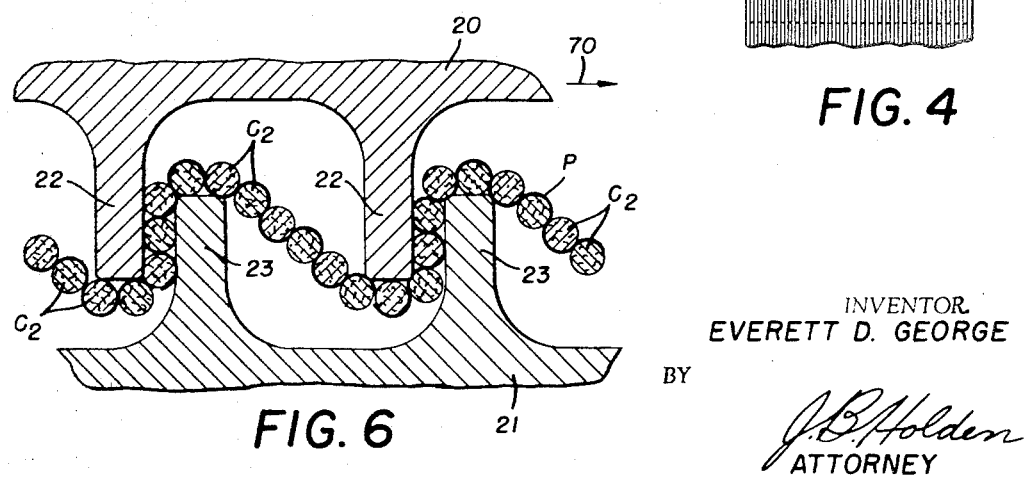
FIG. 6
INVENTOR.
EVERETT D. GEORGE
BY
J.B. Holden
ATTORNEY INVENTOR.
EVERETT D. GEORGE
BY
J.B. Holden
ATTORNEY Sept. 9, 1969        E. D. GEORGE        3,465,933
PICK BREAKING APPARATUS
Filed Dec. 10, 1965        4 Sheets-Sheet 4
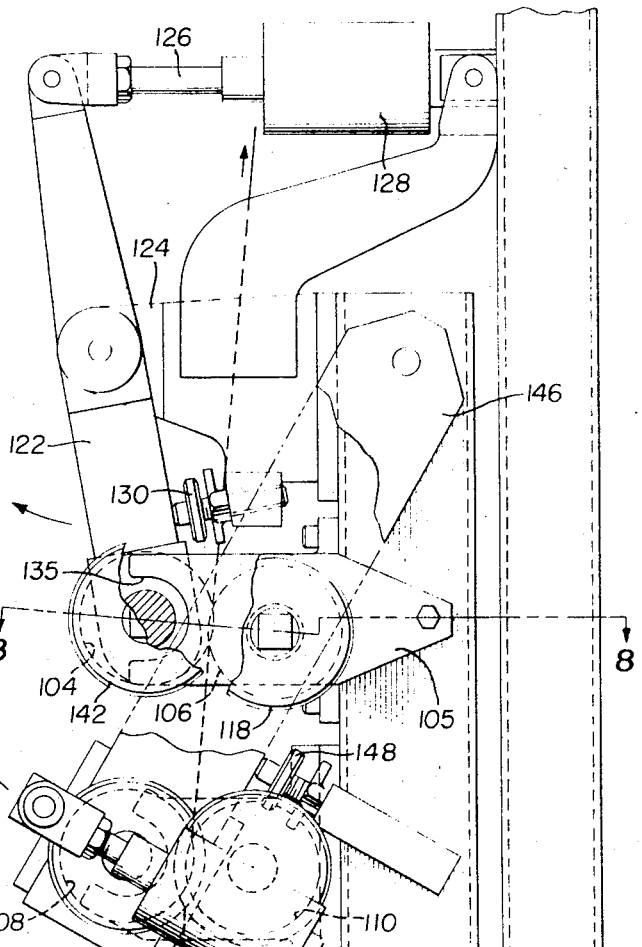
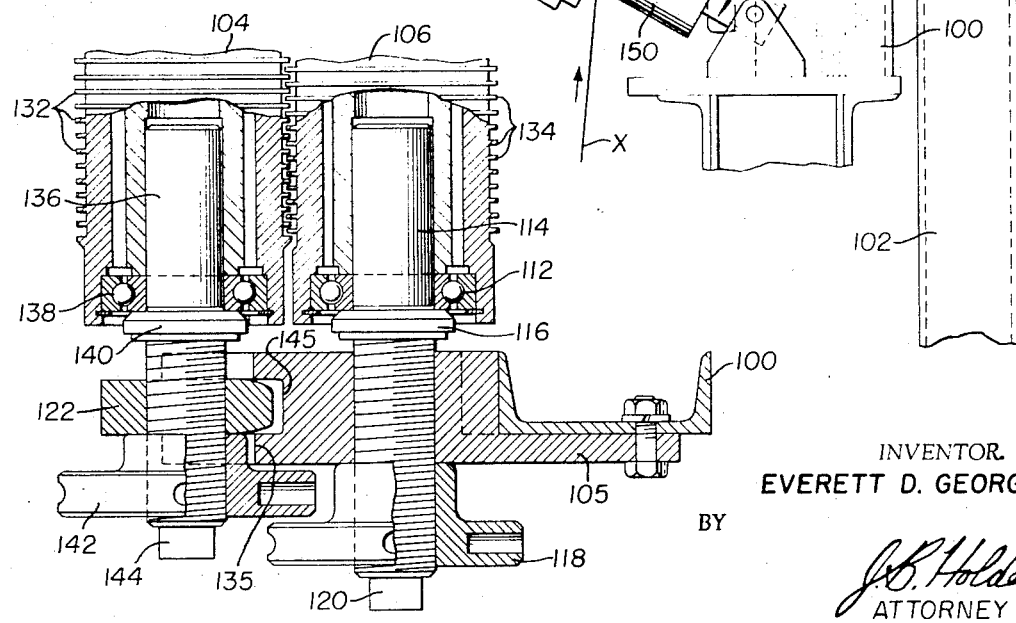
INVENTOR.
EVERETT D. GEORGE
BY
*J. B. Holden*
ATTORNEY United States Patent Office 3,465,933
Patented Sept. 9, 1969

3,465,933
PICK BREAKING APPARATUS
Everett D. George, 2446 Chestnut Blvd.,
Cuyahoga Falls, Ohio 44223
Continuation-in-part of application Ser. No. 444,663,
Apr. 1, 1965. This application Dec. 10, 1965, Ser.
No. 515,803
Int. Cl. B26f *3/00, 3/02;* B65h *35/00*
U.S. Cl. 225—97                                     10 Claims

ABSTRACT OF THE DISCLOSURE

Apparatus for breaking the pick threads of tire cord fabric is disclosed, including a pair or pairs of rolls having mutually interfitting grooves and flanges, one roll of a pair and/or one of a plurality of pairs are adjustably positioned with respect to the other thereof to alter the degree of interaction between the flanges of cooperating rolls.

The foregoing abstract is not to be taken as limiting the invention of this application, and in order to understand the full nature and extent of the technical disclosure of this application, reference must be made to the accompanying drawings and the following detailed description.

---

This invention relates to the art of pneumatic tire construction, and in particular has reference to an improved form of pick breaking apparatus adapted to break "pick" cords present in fabric plies being processed.

This application is a continuation-in-part of my copending application Ser. No. 444,663, filed Apr. 1, 1965, and now abandoned.

In the art of pneumatic tire manufacture, it has been customary to employ parallel strands of fabric cord, which are passed through one or more calenders for the purpose of coating the opposed faces of the card with rubber to thus form a suitable fabric ply for tire building purposes. To insure stability of such fabric cords during processing, it has been found advantageous to provide transverse interwoven strands that serve to stabilize cords processing. Such strands are known in the industry as "pick" threads and preferred practice is to break the same into small transverse bits so as to eliminate their interference with subsequent operations, with the pick breaking normally being accomplished after calendering of the fabric, the pick being unnecessary after calendering has been completed. A full and complete description of pick breaking apparatus adapted for this purpose is set forth in U.S. Patent 2,217,607, dated Oct. 8, 1940, and being the joint invention of Malcolm G. Anderson and the present applicant.

In the pick breaking apparatus of U.S. Patent 2,217,607, the fabric cord was passed between a pair of opposed rollers that had mating ribs and grooves that interfit for the purpose of breaking the "picks" in question, as above noted. While the pick breaking principle of the above invention has proved sound and satisfactory over the years, it has nonetheless been discovered that the same is possessed of certain limitations because of the inflexibility of the device. Specifically, no provision was made therein to accommodate plies whose cords were of different diameters with the only adjustment in the prior unit being one where one roller was shifted between "separated" or "engaged" relationship with the other roller. Further problems have been encountered with the introduction of synthetic thread material such as nylon which requires greater stretching before breaking thereof will occur.

It has been found however, that the aforementioned disadvantages of the known prior art, can be obviated by making provision to adjust the pick breaker rolls with respect to each other so that the spacing of one set of roll flanges within the remaining roll grooves can be varied in two directions to permit accommodation of different sized cords while simultaneously increasing the stretch presented on the pick thread for pick breaking purposes. In this fashion the machine is adapted for use with a wide range of fabric cord diameters and is further adapted to impart greater stretching and breaking pressure on any given pick thread.

In this fashion and as illustrated in the accompanying drawings, a wide range of pick thread diameters can be effectively processed without change of equipment.

Production of an improved pick breaker having the above characteristics, accordingly, becomes the principal object of this invention with other objects thereof becoming more apparent upon a reading of the following description considered and interpreted in the light of the accompanying drawings.

Of the drawings:

FIGURE 1 is a schematic view in side elevation showing a pick breaker unit incorporating the present invention;

FIGURE 4 is a plan view of a portion of the fabric F as the same approaches the pick breaker, said portion being indicated at 4—4 of FIGURE 1;

FIGURES 5 and 6 are enlarged, fragmentary, cross-sectional views showing the relationship between the teeth and grooves of a pair of pick breaker rolls and illustrating adjustment of the rolls;

FIGURE 7 is a fragmentary, side elevational view, partly cut away, of an alternative embodiment of a pick breaker constructed in accordance with the present invention; and FIGURE 8 is an enlarged, fragmentary, cross-sectional view taken substantially along the lines 8—8 of FIGURE 7.

Figure 2:
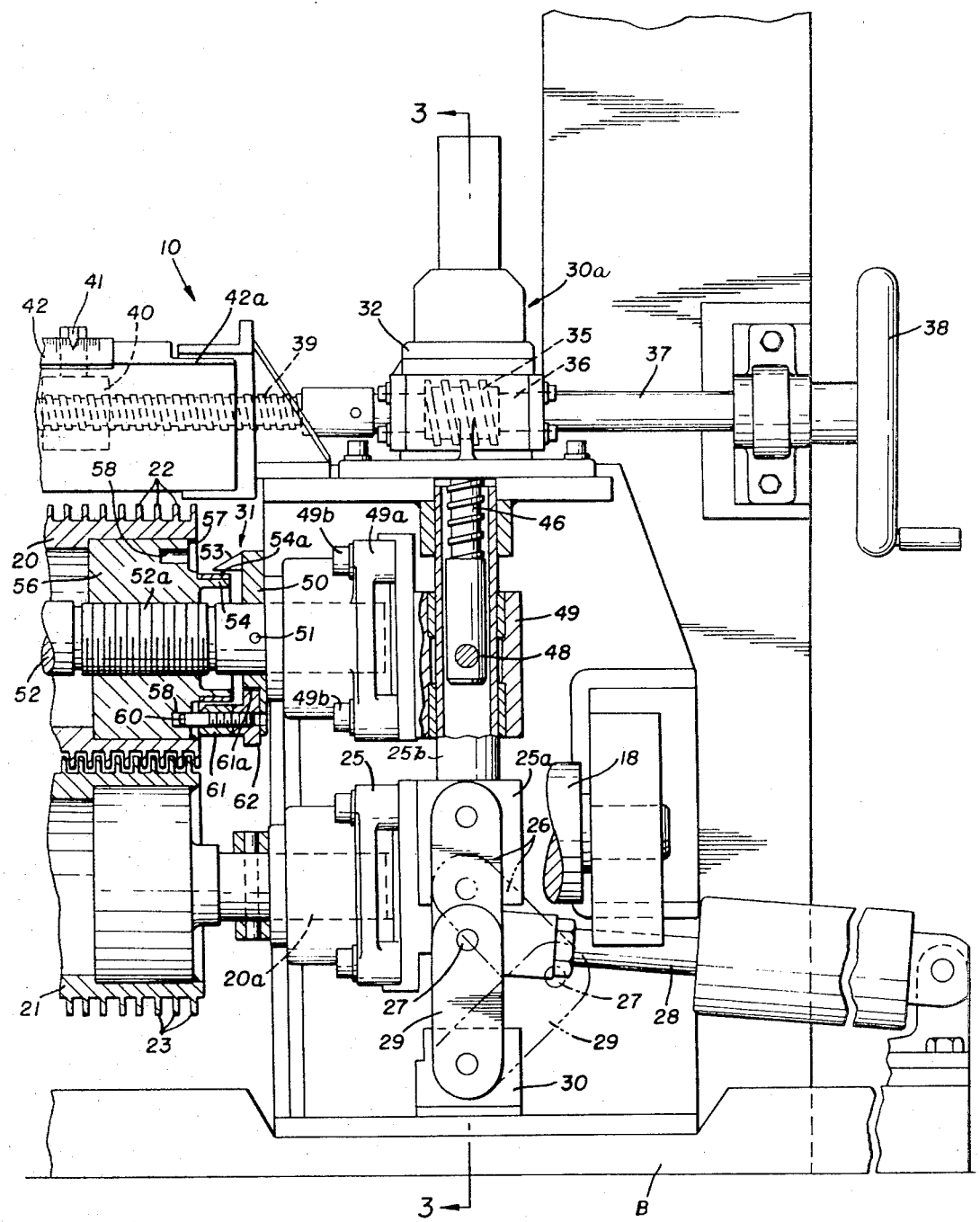
FIGURE 2 is a fragmentary, cross-sectional view taken substantially along the lines 2—2 of FIGURE 1.

Referring now to the drawings and in particular to FIGURE 1, the improved pick breaking unit, generally designated by the numeral 10, is shown interposed between the calender unit 11 and the storage reel 12, so as to break the transverse pick threads P of fabric F (FIGURE 4) during the time that the same advances in the direction of the arrow 15A of FIGURE 1. In this regard, and with the exception of the pick breaker 10, the calender and storage reels are of conventional construction wherein the fabric F advances between calender rolls 15 and 16 so as to have applied thereon a coating of rubbery material R that is squeezed between the opening or nip between the rolls 16 and 17. The usual guide rolls 18 are arranged to convey the fabric F to the storage roll 12, with liner material L being applied thereon in known fashion from liner reel LR.

It has been previously indicated that the improved pick breaker comprises an upper pick breaker roll 20, and a parallel lower pick breaker roll 21, with each of these rolls having closely spaced radially extending and axially spaced, annular flanges that define grooves therebetween, with one set of flanges being received in the grooves of the other roll and vice versa, as is clearly apparent from FIGURES 2, 5 and 6 of the drawings. Accordingly, and for numerical designation, the upper roll 20 has equally spaced radial flanges 22 while the lower roll 21 has equally spaced radial flanges 23.

For the purpose of imparting relative adjusting movement to the just described rolls 20 and 21, the lower roll 21 is shown having its end 20a journalled within the bearing 25, with bearing 25 being connected to cross slide 25a for reciprocation vertically with respect to vertical column 25b. Additionally, the cross slide 25a has pinned thereto a link arm 26, with the opposed end of link arm 26 being in turn pinned, as at 27, to first the end of a piston rod 28 and second to the upper end of a lower link arm 29, with the remaining end of arm 29 being pivoted around an abutment 30 that is secured to base B as best shown in FIGURE 2. By this arrangement, actuation of the piston rod 28 in known manner serves to move the toggle link arms 26 and 29 between the full and chain-dotted line positions of FIGURE 2, so as to respectively raise and lower the lower roll 21. Although not shown in detail, the preferred embodiment of the invention herein contemplated envisions that the piston rod 28 that has just been described be actuated in response to the operation of the calendering means, with the preferred arrangement being that the piston will move the just described link arms to the "down" position upon cessation of driving movement by the calendering rolls, with resumption of calendering operation automatically shifting the piston means so as to move the lower roll 21 to its "up" position. In this manner any distortion of fabric due to roll engagement in the deformed undulated condition of FIGURES 5 and 6 for example, is eliminated.

Turning again to FIGURE 2 for a detailed consideration of the mechanism by which the upper roll 20 is adjusted, it should be first noted that two actuating mechanisms, respectively designated generally by the numerals 30a and 31, are employed for respectively achieving (1) vertical, and (2) horizontal (FIGURE 2) adjustment of roll 20 with respect to roll 21, with separate descriptions being undertaken with respect to each of these just described adjusting means. Accordingly, and first considering the adjustment means 30a, the same includes a jack screw lifting unit 32, which operates in general to raise or lower roll 20 upon rotation of hand wheel 38. Referring to FIGURE 2, the unit 30a further includes a worm screw 35 that is provided on a central shaft 36, with one end of shaft 36 being pinned to actuator shaft 37 that is rotated by hand wheel 38, while the other end of shaft 36 is pinned to a fast lead screw 39 that is threadingly engaged with a scale block 40 and pointer arm 41 so as to move relative to scale 42 on frame 42a.

By the construction just described, the rotation of the hand wheel 38 will move pointer 41 relative to scale 42, with such scale movement indicating the amount of vertical travel effectuated by the adjustment means 30a. In this regard, reference is made now to FIGURE 3, where the worm screw 35 is shown meshed with the worm gear 45, with worm gear 45 being supported against axial shifting by the retaining bearings normally provided for this purpose, and with said bearings being eliminated from FIGURE 3 for the sake of clarity. Further in this regard, in the preferred form of the invention shown, the worm gear 45 is centrally tapped and threaded for threaded engagement with an elongate, threaded lifting rod 46, with the arrangement being such that rotation of hand wheel 38 around the axis of shaft 36 results in raising and lowering of shaft 46 in the direction of arrow 47 dependent upon the direction of such rotation (see FIGURE 3).

Again referring to FIGURE 2, the lower end of shaft or lifting jack 46 is shown received within a cross slide 49 with a pin 48 fixing the jack screw 46 against rotation about its longitudinal axis relative to the slide 49 and with the cross slide 49 being reciprocably mounted on an upper portion of column 25b. Further in this regard, the upper roll 20 is shown as mounted for rotation about the axis of a shaft 52, with the outboard ends of shaft 52 being rotatably journaled within bearings 49a which is secured as by bolts 49b to cross slide 49 with this arrangement causing roll 20 to be raised or lowered simultaneously with the raising or lowernig of shaft 46 and with such entire adjustment being effectuated by the just described control mechanism 30a.

While vertical shifting of roll 20 is accomplished as just described, it has also been indicated that the roll 20 is axially adjusted by control means 31, and accordingly a detailed description of control means 31 will now be undertaken. In this regard and referring first to FIGURE 2, the control means 31 in essence includes a control or locking plate 50 that is capable of being selectively interlocked with or released from an end plug 56, with plug 56 being threaded on threaded shaft portion 52a and further being secured to roll 20 as by weld 57. Provision of a pin 51 makes plate 50 rotatable with shaft 52 so that rotation of plate 50 in its unlocked position with respect to plug 56 will cause axial shifting of drum 20. To the end of effectuating such an interlock the plate 50 includes an abutment 61 defining a slot 61a within which an adjustment knob 62 can be received with knob 62 being interiorly threaded for reception of a threaded pin 60, the free end of which can be selectively advanced or retracted axially for insertion or removal with respect to a series of radially spaced openings 58 in the outer end face of the plug 56. In this fashion, turning of nut 62 will shift pin 60 into or out of engagement within an aligned aperture 58 so as to permit or prevent relative rotation between plate 50 and block 56 with such relative rotation effectuating an axial shifting of roll 20 by virtue of the threaded engagement between plug 56 and threaded portion 52a.

The plate 50 further includes a pointer 53 that overlies a scale 54a that is secured around the periphery of hub extension 54 on plug 56, as clearly shown in FIGURE 2 of the drawings. With the thread pitch of the threaded portion of shaft 52 being known, the scale 54a can be calibrated to give a true reading representative of the axial shifting that occurs upon rotation of plate 50 as just described.

In use or operation of the improved pick breaker, it will first be assumed that the component parts have been assembled to the position indicated in the drawings, with the lower roll 21 being in the "down" position shown in chain-dotted lines in FIGURE 2 of the drawings. When it is desired to break the pick thread of the fabric F the piston rod 28 may be actuated to the full line position of FIGURE 2, whereupon the flanges 23, 23 of roll 21 will be inserted between the flanges 22, 22 of upper roll 20 as clearly shown in FIGURES 2 and 5 of the drawings. If it is desired to have the flanges 22 projected further within the space between flanges 22, 23, it is merely necessary to actuate hand wheel 38 in the appropriate direction to cause lowering of the shaft 46 with such lowering resulting from operation of the control mechanism 30a as has been earlier described. The extent of such movement will be indicated to the operator by noting the respective position of pointer 41 with reference to scale 42 both before and after such movement, with scale 42 giving a direct reading on the amount of penetration by the leading edge of flanges 22, 22.

The arrangement just described will properly break the pick threads present in the fabric cord $C_1$ as shown in FIGURE 5. However, when a pick thread interwoven between cords $C_2$ of lesser diameter is present as shown in FIGURE 6, some adjustment will be required to effectuate breaking thereof, and accordingly, at this point, the adjustment means 31 will be operated to shift the upper roll 20 to the right, as viewed in FIGURE 6, in the direction of arrow 70. In this regard, such adjustment is effectuated by rotating the adjustment knob 62 so as to back the pin 60 out of opening 58 and thus permit relative rotation to occur between plate 50 and roll 20, and thus effectuate axial shifting. It will again be noted that by taking a reading between pointer 53 and scale 54a that a true measurement of axial movement can be achieved.

It will be seen from the foregoing how there has been provided a new and improved type of pick breaker that features micrometrically measured axial and radial adjustment of one pick breaker roll with respect to a complementary pick breaker roll for the purpose of breaking pick threads of varying diameters. The importance of such pick breaking operation is believed apparent when it is remembered that the presence of unbroken pick threads will result in unbalance occurring due to breaking of the pick thread during the shaping process due to the excessive strain provided on the same.

If desired, a second calender could be employed, as was disclosed in the aforementioned patent, and additionally, the axial and radial adjustment means (31 and 30a) could be applied to the lower roll instead of the upper roll as has herein been described. Similarly, while the rollers 17, 17 have been shown disposed in a specific train so as to center the fabric in the rolls, it is to be understood that other roller or guiding arrangements could be employed alternately. Additionally, while a specific showing has been made only with reference to supporting and shifting one end of rolls 20, 21 it is to be understood that similar arragements can be made at the remaining ends, except that the remaining end of roll 20 will normally be jornalled for free axial shifting. Also, while a specific form of worm gear jack has been shown it is to be understood that other arragements that effectuate lifting movement while measuring the amount thereof, either in the same, or at right angles could be employed if desired.

Figure 3:
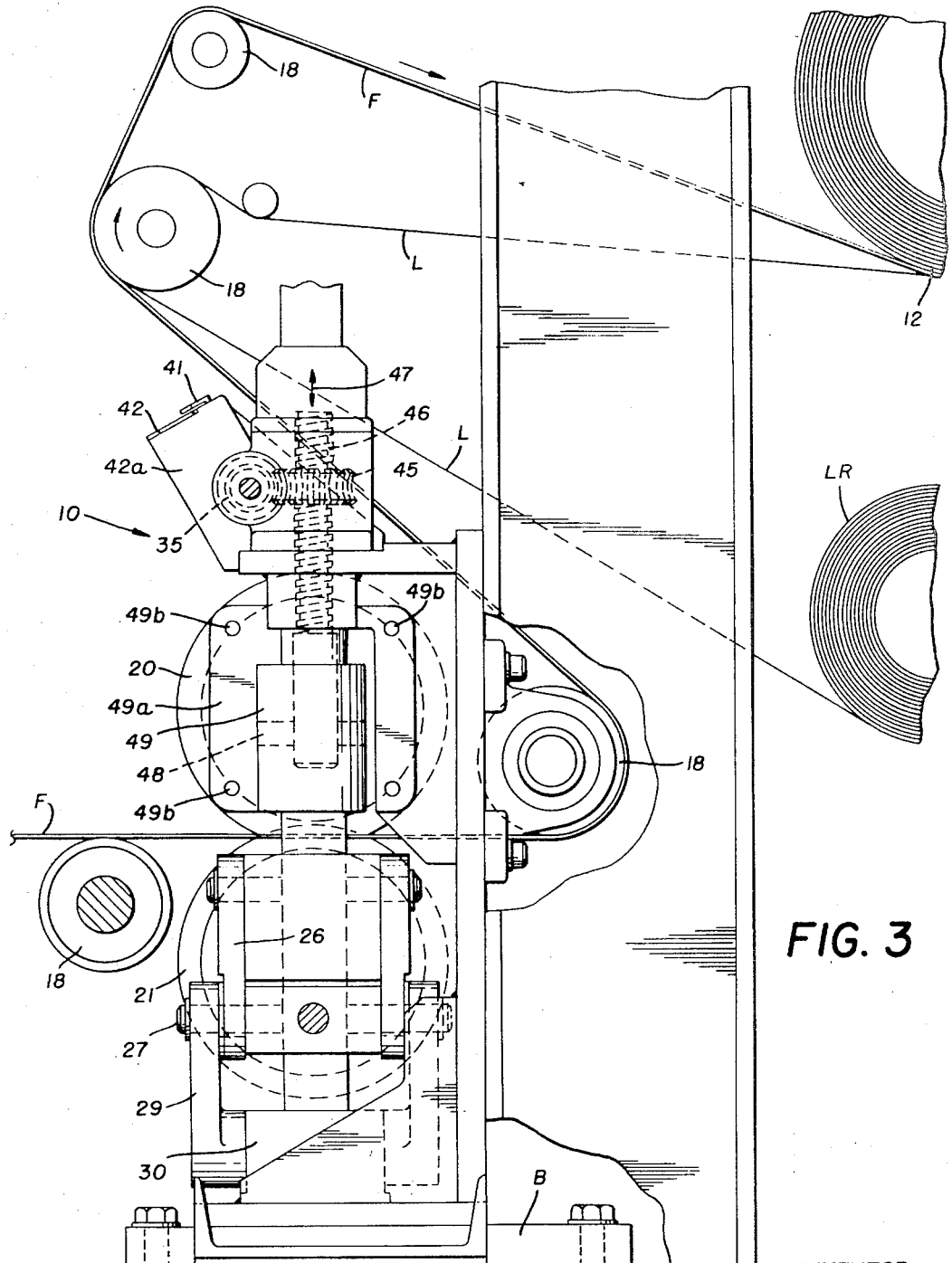
FIGURE 3 is an end elevational view taken in the direction indicated at 3—3 in FIGURE 2.

The present invention also contemplates a second pick breaker unit, disposed in line with the first unit but being offset axially therefrom by one half of a flange spacing so as to effectuate a further breaking of already broken pick segments. For example, the flanges 22 and 23 of the rolls 20 and 21 previously described might be dimensioned to have a width, and the rolls arranged to space the flanges from each other a distance, selected to provide that there will be ten cords between each next adjacent pair of breaks in a pick as, for example, shown in FIGURE 6. When the tire is subsequently shaped, there will be a slight displacement or spacing between each sets of cords corresponding to an unbroken pick length and the next adjacent such set of cords. It may be that in certain tires this spacing will be undesirable, and it would be preferred that the picks be broken at greater frequency so as to reduce the spacing along the outer circumference of the shaped cord ply between next adjacent sets of cords corresponding to unbroken lengths of picks. The provision of a second set of pick breaker rolls in tandem with the first set, just described, but offset axially from the first set a distance equal approximately to one half of the spacing of the flanges on each pick breaker roll will effect a further breaking of the picks approximately in the middle of the pick segments left unbroken by the first set of rolls. While a tandem arrangement could comprise two pick breaker units as shown in FIGURES 1 to 3 in order to accomplish the desired objective, this aspect of the invention will now be described in connection with an alternative embodiment of a pick breaker incorporating the aspects of the previously described embodiment with respect to axial and radial relative movement between the pair of rolls of each unit, but having further advantages particularly in connection with the processing of cords of different diameters.

With reference to FIGURES 7 and 8, the pick breaker therein depicted comprises a frame including a base (not shown) and frame members 100 to 102 fixed to the base. As shown in FIGURE 7, two pairs of parallel pick breaker rolls 104, 106 and 108 and 110 are supported on the frame. The pairs of rolls are in parallel and generally aligned with the path of movement of the cord ply as indicated at X in FIGURE 7, whereby the cord ply will pass through the lower pair of rolls 108 and 110 and then through the upper pair of rolls 104 and 106. With reference to FIGURES 7 and 8, the roll 106 is journalled at one end by a bearing 112 carried on a stub shaft 114 which extends coaxially of and within one end of the roll. The bearing 112 is maintained seated in the roll by a lock nut 116 threaded over the portion of the stub shaft 114 projecting axially outwardly of the roll. The stub shaft 114 is threadably engaged within an aperture in a bracket 105 which is fixed to the frame member 100. The stub shaft 114 projects beyond the bracket 105 and threadably mounts at its outer end a lock nut 118 which is engageable with the side of the bracket 105 opposite the roll 106 to lock the shaft 114 in threadably adjusted position relative to the bracket 105.

When it is desired to change the axial location of the roll 106, the lock nut 118 is backed off and a tool is engaged with the squared end portion 120 of the shaft 114 whereby the shaft may be rotated to effect inward or outward threading of the same relative to the bracket 105 and thus vary the axial location of the roll 106. The other end of the roll 106 (not shown) is journalled in a manner similar to that just described. However, the stub shaft at this end of the roll is merely slidably mounted in a bearing carried by the frame so as to be free to move in response to adjustment of the stub shaft 114.

The roll 104 is supported at each end by one end of each of a pair of pivoted levers 122, only one of which is shown. The mounting of the roll 104 at each end thereof is similar and therefore, in the interest of brevity, only the mounting at one end of the roll will be shown and described in detail. As shown in FIGURE 7, the lever 122 is pivoted intermediate its ends on a bracket 124 which is fixed to the frame member 100, whereby the lever 122 may be pivoted about an axis extending parallel to the axis of the roll 106. The upper end of the lever 122 is pivotally connected to the outer end of a piston rod 126 extending from one end of an air motor or pneumatic cylinder 128. The other end of the air cylinder 128 is pivotally mounted on the frame member 102. As will be apparent, actuation of the air cylinder 128 to move the piston rod 126 outwardly of the cylinder will cause the lower end of the lever 122, and thus the roll 104, to be moved toward the roll 106. Correspondingly, retraction of the piston rod 126 will move the roll 104 away from the roll 106. Movement of the lever 122 in a direction to move the roll 104 toward the roll 106 is limited by engagement of the lever 122 with a stop 130 carried by the frame on which the roll 106 is supported. The stop 130 is adjustable so as to permit selective adjustment of the limit of movement of the lever 122 in a counterclockwise direction, as viewed in FIGURE 7.

As can be seen in FIGURE 8 the rolls 104, and 106 are provided with flanges 132, 134, respectively, which are of a construction and have a function similar to the flanges 22 and 23 previously described. Axial adjustment of the roll 104 is accomplished in a manner similar to that of the roll 106. More specifically, the roll 104 has a stub shaft 136 which is journalled in a bearing 138 retained coaxially within the end of the roll by a lock nut 140 threaded over the shaft 136. The stub shaft 136 extends through and is threadably engaged in an opening through the lever 122, and a lock nut 142 threadably engaged over the outer end portion of the shaft 136 is engageable with the side of the lever opposite the roll 104 to assure retention of the shaft in axially adjusted position. The shaft 136 is provided at its terminal outer end with a squared tool engageable portion 144 to facilitate rotation of the shaft and attendant axial adjustment of the roll 104. The other end of the roll 104 is supported for rotation and axial movement on the other lever 122 (not shown) in the same manner as said other end of the roll 106 is supported on the other bracket 105, not shown, but described above.

In setting up the rolls 104 and 106 for operation, the necessary relative axial displacement between the rolls is first effected in order to provide the desired axial spacing of the flanges 132 and 134 for the same purpose as described in connection with the rolls 20 and 21 previously described. In this connection and with reference to FIGURE 8, it will be noted that the bracket 105 is provided at its outer end with a generally semicircular recess 135 for the reception of an edge portion of the lever 122. The base of the recess being further provided with a groove 145 extending at right angles to the axis of the roll 106 and within which the lever 122 is receivable when the lever 122 is in a position corresponding to the positioning of the roll 104 with its flanges 132 disposed between the flanges 134 of the roll 106. In this connection the width of the portion of the lever 122 which fits within the pocket or groove 145 is approximately the same width as the groove 145 although being tapered slightly so as to facilitate entry of the lever into the groove while at the same time assuring that when the lever is received in the groove and play therebetween in the direction of the axes of the rolls will be insufficient to affect significantly the accuracy of location of the flanges or the roll 104 relative to the flanges on the roll 106.

After the rolls 104 and 106 have been adjusted axially, commensurate with the diameter of the cords of the ply being processed, the stop 130 is adjusted so as to assure that the lever 122 may be moved toward the roll 106 sufficiently to provide that the cords of least diameter, over the range of diameters of cords capable of being processd with these rolls, will be bottomed on the roll 106 by the flange 132 of the roll 104. When a ply of cords of larger diameter is processed, the roll 104 will automatically be positioned a greater distance from the roll 106 inasmuch as the air motor 128 provides a yieldable resilient drive of the lever 122 either by reason of the air pressure serving to drive the piston rod 126 in a direction corresponding to movement of the roll 104 toward the roll 106 or by reason of a return spring in the motor 128 driving the piston rod 126 in this direction. Thus, it will be seen that plies having cords of different diameters may be processed through the rolls 104, 106 without requiring adjustment of the lateral spacing of the rolls 104, 106.

The rolls 108 and 110 are mounted for axial adjustment and for movement of the roll 108 toward and away from the roll 110 in a manner similar to the rolls 104 and 106 just described, and, therefore, the mounting of the rolls 108 and 110 will not be described in detail. Further, the rolls 108 and 110 are provided with flanges such as the flanges 132 and 134 previously described, which are in size and spatial relationship identical with the flanges 132 and 134. Thus, generally speaking, the rolls 108 and 110 are in structure, function and manner of mounting substantially identical with the rolls 104 and 106. In the set up of the rolls 108 and 110, the rolls are adjusted axially so as to offset the flanges thereof from the corresponding flanges on the rolls 104 and 106, respectively, by a distance approximately equal to one half the spacing of the flanges on any one roll. The means for adjusting the rolls 108, 110 longitudinally of their axes permits, not only the axial offsetting of the rolls 108 and 110 from the rolls 104 and 106, but also relative axial adjustment between the rolls 108 and 110 consistent with the size of the cords of the ply being processed. As in the case of the roll 104, the lever 146, which carries the roll 108, has its counterclockwise movement, as viewed in FIGURE 7, limited by a stop 148 which is adjustable. The stop 148 is preferably adjusted so that, with the lever 146 engaged with the stop, the flanges of the roll 108 will extend into the spaces between the flanges on the roll 110 sufficiently to assure that a cord of least diameter to be processed will be bottomed on the roll 110. The lever 146 is actuated by an air motor 150, thereby providing a yieldable resilient drive of the lever so as to provide automatic adjustment of the lateral spacing of the roll 108 from the roll 110 consistent with the size of cord being processed, as described in connection with the rolls 104, 105.

The rolls 108 and 110 are located relatively closely adjacent to the rolls 104 and 106 so as to minimize any lateral movement of the fabric being processed as it passes from the first set of rolls 108, 110 to the second set of rolls 104, 106. As the fabric is passed through the first set of rolls 108, 110, the picks will be broken into substantially equal length sections. Subsequently, as the fabric passes through the second set of rolls 104, 106 the pick sections will be broken approximately at their midpoints.

When it is desired to utilize only one set of rolls, either the roll 104 or 108 may be moved out of interposition with the associated roll 106 or 110 by suitable actuation of the air motor 128 or 150, whereby the fabric may be passed through the other set of rolls only. While the assembly of FIGURES 7 and 8 has been described in connection with mounting of each of the rolls for axial adjustment, it will be apparent that, if it is desired to process only one size of cord, the roll 106 or the roll 110 could be mounted in a manner whereby it was not adjustable in an axial direction so long as the other of the rolls 106 and 110 may be adjusted axially so as to obtain the desired axial offsetting between the pairs of rolls. It will also be apparent that other means of providing axial adjustment of any of the rolls could be utilized. For example, the brackets mounting the stub shafts for these rolls could be adjustably supported on the frame rather than having the shafts adjustably carried by the brackets. Further, other known means for providing a yieldable drive of the rolls 104 and 108 in directions laterally of the rolls 106 and 110 could be provided without departing from the invention. It will also be apparent that more than two sets of rolls, axially offset from one another, could be utilized, if desired, in order to provide pick breaking at intervals less than that provided by any one set of rolls. Further, if desired, the pick breaker rolls may be powered so as, for example, to be rotated at a speed consistent with the surface speed of the fabric being processed, thereby to reduce the power required to draw the fabric through the rolls. Inasmuch as the above, as well as other modifications, alternatives and alterations could be provided in the structure described above without departing from the present invention, it will be apparent that the foregoing description and accompanying drawings are to be taken solely as illustrative and not in a limiting sense. It is also to be understood that the language in the following claims is intended to cover all of the generic and specific features of the invention and all statements of the scope of the invention which, as a matter of language, might be said to fall therebetween.

What is claimed is:

1. A pick breaker comprising a pair of parallel rolls each having annular radially outwardly extending flanges on the periphery thereof and spaced apart axially thereof, the flanges of each of said rolls extending into the space between the flanges of the other of said rolls, and means for effecting relative axial shifting between the rolls, thereby to change the spacing between the interposed flanges of the rolls.

2. A pick breaker of the type described in claim 1 further comprising means for varying the distance between the axes of said pair of rolls.

3. A pick breaker as described in claim 2 wherein the last mentioned means comprises means yieldingly urging one of the rolls toward the other of the rolls, and adjustable means for limiting the movement of one roll toward the other roll.

4. A pick breaker comprising two pairs of rolls, each roll having a plurality of generally annular radially outwardly extending flanges spaced axially along the periphery thereof and interposed with the flanges of the other roll of the respective pair thereof, the rolls of one pair thereof being offset axially with respect to the corresponding rolls of the other pair thereof, whereby each pick of a fabric passed sequentially through said two pairs of rolls will be broken into sections each of a length less than could be achieved by either pair of rolls alone.

5. A pick breaker as described in claim 4 further comprising means for selectively adjusting at least one pair of rolls in a direction axially of the other pair of rolls.

6. A pick breaker as described in claim 4 further comprising means mounting at least one roll of each pair thereof for selective adjustment axially relative to the other roll of the respective pair.

7. A pick breaker as described in claim 6 further comprising means mounting one roll of each pair thereof for movement toward and away from the other roll of the pair thereof, means yieldingly urging one roll of each pair toward the other roll of each pair, and adjustable means for limiting the movement of the rolls of each pair thereof toward each other.

8. A pick breaker as described in claim 4 in which one pair of rolls is disposed sufficiently closely adjacent the other pair of rolls to at least minimize twisting of fabric passing sequentially between said two pairs of rolls.

9. A pick breaker as described in claim 2 further including a frame, the last mentioned means carrying means mounting one of said rolls on said frame including a threaded shaft coaxial with said one of said rolls and threadably engaged with another member providing a support for said one of said rolls, whereby relative rotation between said shaft and said member will effect axial shifting of said one of said rolls.

10. A pick breaker as described in claim 2 further comprising a frame, means supporting said pair of rolls on said frame including mounting means mounting one roll for movement in a direction laterally of and toward and away from the other roll, and means movable with said mounting means in said direction and cooperative with means fixed relative to said frame when the rolls are in pick breaking position to eliminate at least substantially movement of said mounting means axially of said other roll, thereby assuring that a previously set relative axial adjustment between the rolls will be preserved following movement of said one roll away from and back into pick breaking position with said other roll.

References Cited

UNITED STATES PATENTS

| 745,560 | 12/1903 | Bell | 241—236 X |
| 1,011,906 | 12/1911 | Bonfield et al. | 156—495 |
| 2,217,607 | 8/1936 | Anderson et al. | 156—594 |

EARL M. BERGERT, Primary Examiner

W. E. HOAG, Assistant Examiner